US012225499B2

(12) United States Patent
Ezrielev et al.

(10) Patent No.: US 12,225,499 B2
(45) Date of Patent: Feb. 11, 2025

(54) ADAPTIVE SENSOR POSITION DETERMINATION FOR MULTIPLE MOBILE SENSORS

(71) Applicant: Dell Products L.P., Round Rock, TX (US)

(72) Inventors: Ofir Ezrielev, Be'er Sheba (IL); Nadav Azaria, Meitar (IL); Avitan Gefen, Lehavim (IL)

(73) Assignee: Dell Products L.P., Round Rock, TX (US)

( * ) Notice: Subject to any disclaimer, the term of this patent is extended or adjusted under 35 U.S.C. 154(b) by 410 days.

(21) Appl. No.: 17/579,771

(22) Filed: Jan. 20, 2022

(65) Prior Publication Data

US 2023/0232364 A1 Jul. 20, 2023

(51) Int. Cl.
 *H04W 84/18* (2009.01)
 *G06N 3/08* (2023.01)
 *H04W 64/00* (2009.01)

(52) U.S. Cl.
 CPC ............ *H04W 64/006* (2013.01); *G06N 3/08* (2013.01); *H04W 84/18* (2013.01)

(58) Field of Classification Search
 CPC ...... H04W 64/006; H04W 84/18; G06N 3/08; G06N 3/006; G06N 3/044; G06N 3/045
 (Continued)

(56) References Cited

U.S. PATENT DOCUMENTS

| 11,640,163 | B1 * | 5/2023 | Nguyen | G05B 23/0221 |
| | | | | 702/183 |
| 2022/0050172 | A1 * | 2/2022 | Moulton | G01S 17/86 |
| 2023/0168411 | A1 * | 6/2023 | Marvaniya | G01W 1/10 |
| | | | | 706/12 |

FOREIGN PATENT DOCUMENTS

CN 113222265 A * 8/2021

OTHER PUBLICATIONS

Mohammad Omidalizarandi, et al. Positioning Based on Integration of Multi-Sensor Systems Using Kalman Filter and Least Square Adjustment, Oct. 2013, DOI: 10.5194/isprsarchives-XL-1-W3-309-2013, pp. 309-314.

(Continued)

*Primary Examiner* — Hirdepal Singh
(74) *Attorney, Agent, or Firm* — Ryan, Mason & Lewis, LLP

(57) ABSTRACT

Techniques are provided for adaptive sensor position determination for multiple mobile sensors. One method comprises obtaining a spatio-temporal representation of sensor measurements, from multiple mobile sensors, wherein the spatio-temporal representation comprises multiple layers each corresponding to a different point in time, wherein a given layer comprises multiple positions, and wherein each position in the given layer corresponds to a possible location for at least one of the multiple mobile sensors in an environment; applying the spatio-temporal representation to an environment state prediction model that generates a prediction of at least one future sensor measurement value for multiple positions in the spatio-temporal representation; applying the predictions of the at least one future sensor measurement value to a sensor position determination model that determines a new position for each of one or more of the multiple mobile sensors; and initiating a movement of the one or more of the multiple mobile sensors to the new position.

20 Claims, 7 Drawing Sheets

(58) Field of Classification Search
USPC .................................................. 455/456.1
See application file for complete search history.

(56) References Cited

OTHER PUBLICATIONS

James A. Grant et al. Adaptive Sensor Placement for Continuous Spaces, arXiv:1905.06821v1 [stat.ML] May 16, 2019, pp. 1-13. https://arxiv.org/pdf/1905.06821.pdf.

Pengcheng Zhan et al. Adaptive Mobile Sensor Positioning for Multi-Static Target Tracking, May 29, 2018, pp. 1-23. https://newport.eecs.uci.edu/~swindle/pubs/AdaptiveMobileSensorPositioningforMultiStatic.pdf.

Mike Ball, Multi-Sensor Positioning Solution Launched for Drones & Robotics, Unmanned Systems Technology, Oct. 12, 2020, pp. 1-6 https://www.unmannedsystemstechnology.com/2020/10/multi-sensor-positioning-solution-launched-for-drones-robotics/.

Rozemberczki, Benedek, et al. "Pytorch Geometric Temporal: Spatiotemporal Signal Processing with Neural Machine Learning Models." Proceedings of the 30th International Conference on Information and Knowledge Management; pp. 4564-4573, Oct. 2021; https://dl.acm.org/doi/abs/10.1145/3459637.3482014; downloaded on Jun. 27, 2022.

\* cited by examiner

ADAPTIVE SENSOR POSITION DETERMINATION FOR MULTIPLE MOBILE SENSORS

FIELD

The field relates generally to information processing systems and more particularly, to the monitoring of an environment.

BACKGROUND

Multiple mobile sensors, such as Internet of Things (IoT) sensors, are increasingly employed to monitor various indoor and outdoor environments. Typically, the number of available mobile sensors is insufficient to monitor every portion of a given environment at each point in time. Thus, at least some of the multiple mobile sensors may be repositioned over time in order to obtain measurements for desired portions of the given environment.

SUMMARY

In one embodiment, a method comprises obtaining a spatio-temporal representation of sensor measurements, from a plurality of mobile sensors, wherein the spatio-temporal representation comprises a plurality of layers each corresponding to a different point in time, wherein a given layer comprises a plurality of positions, and wherein each position in the given layer of the spatio-temporal representation corresponds to a possible location for at least one of the plurality of mobile sensors in an environment; applying the spatio-temporal representation to an environment state prediction model that generates a prediction of at least one future sensor measurement value for a plurality of positions in the spatio-temporal representation; applying the predictions of the at least one future sensor measurement value to a sensor position determination model that determines at least one new position for each of one or more of the plurality of mobile sensors using the predictions; and initiating a movement of the one or more of the plurality of mobile sensors to the new position.

In some embodiments, the environment state prediction model comprises a graph neural network (GNN) and the sensor position determination model comprises a reinforcement learning (RL) model. The reinforcement learning model may determine the new position for the at least some of the plurality of mobile sensors based at least in part on positions having a higher uncertainty value relative to other positions. The reinforcement learning model may determine the new position for a given mobile sensor based at least in part on a proximity of the given mobile sensor to the new position and/or an energy cost associated with moving the given mobile sensor to the new position.

In one or more embodiments, the environment state prediction model further generates an uncertainty value for each prediction indicating a confidence of the environment state prediction model in a corresponding prediction and further comprising applying the uncertainty value for each prediction to the sensor position determination model that determines the new position for at least some of the plurality of mobile sensors.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for adaptive sensor position determination for multiple mobile sensors.

As noted above, the number of mobile sensors available to monitor a given environment is typically insufficient to monitor every portion of the given environment at each point in time. The disclosed techniques for adaptive sensor position determination dynamically reposition at least some of the multiple mobile sensors over time in order to obtain measurements for each desired portion of the given environment.

In some embodiments, the adaptive sensor position determination techniques employ a graphical representation of the sensor data from multiple sensors (e.g., a sensor swarm), such as a spatio-temporal representation (e.g., a multi-dimensional graph) of the sensor measurements. The spatio-temporal representation may comprise multiple layers, each corresponding to a different point in time. The nodes in a given layer of the spatio-temporal representation may represent possible sensor locations for the multiple mobile sensors in an environment, and the edges between nodes in the given layer may optionally represent paths for the sensors to move among the nodes.

In one or more embodiments, the disclosed sensor position determination techniques dynamically adapt the position of the multiple sensors in the environment over time. For example, an environment state prediction model (e.g., a spatio-temporal GNN) may process the spatio-temporal representation of the environment to generate a prediction of at least one future sensor measurement value for multiple positions in the spatio-temporal representation. In addition, a sensor position determination model (e.g., an RL model)

may process the predictions of the at least one future sensor measurement value to determine a new position for at least some of the mobile sensors.

The disclosed techniques for sensor position determination for multiple mobile sensors adaptively improve (e.g., optimize) the amount of information gained by the sensor swarm, for example, to provide better predictions about the environment. The gained information is measured as the sum of a deviation measure indicating the deviation (e.g., difference) between the predicted future sensor measurement values and corresponding actual sensor measurement values.

Figure 1:
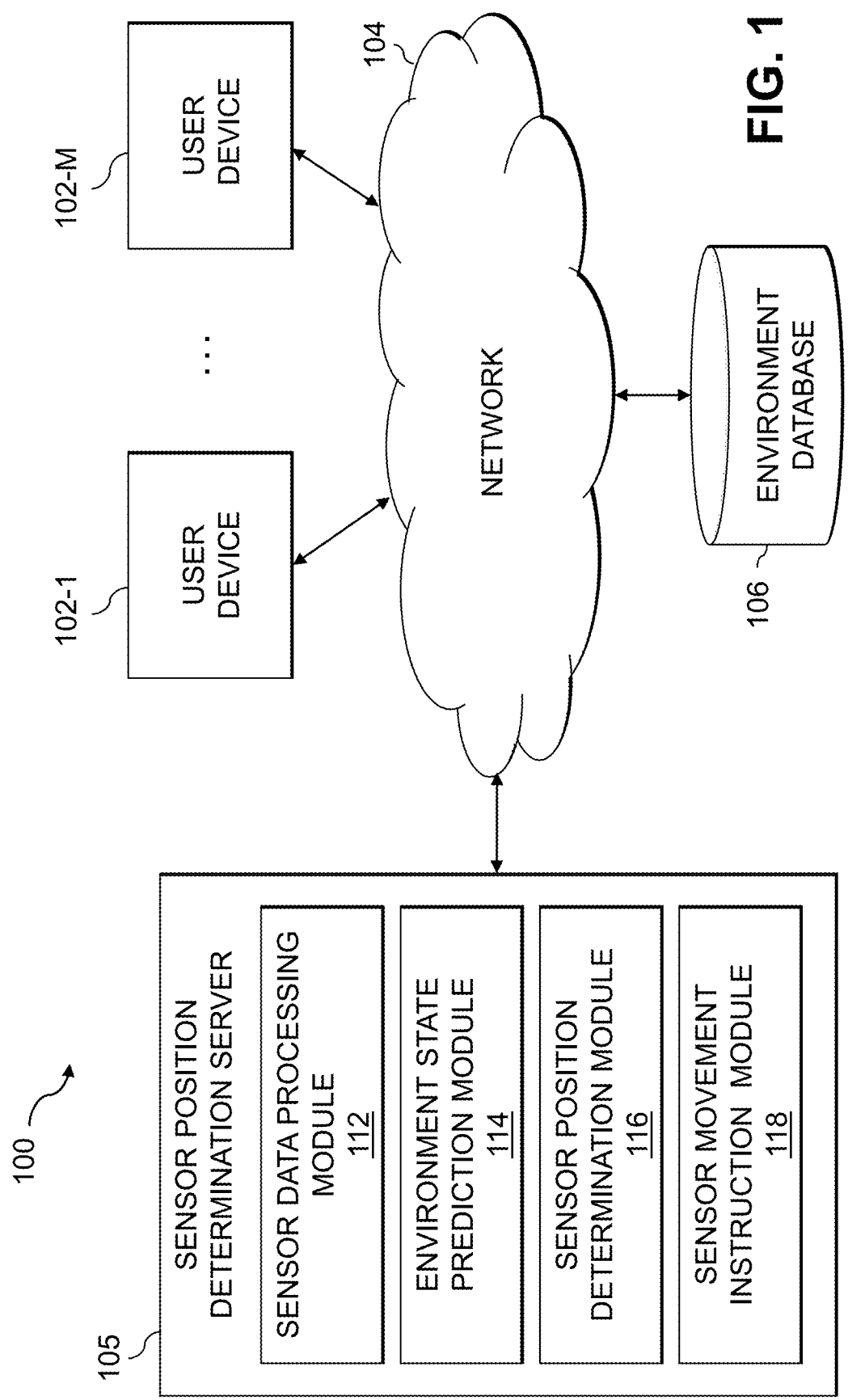
FIG. 1 illustrates an information processing system configured for adaptive sensor position determination for multiple mobile sensors in accordance with an illustrative embodiment.

FIG. 1 shows an information processing system 100 configured in accordance with an illustrative embodiment. The information processing system 100 comprises a plurality of user devices 102-1 through 102-M, collectively referred to herein as user devices 102. The information processing system 100 further comprises one or more sensor position determination servers 105 and an environment database 106, discussed below.

The user devices 102 may comprise, for example, host devices and/or devices such as mobile telephones, laptop computers, tablet computers, desktop computers or other types of computing devices (e.g., virtual reality (VR) devices or augmented reality (AR) devices). Some of these processing devices are also generally referred to herein as "computers." The user devices 102 may comprise a network client that includes networking capabilities such as ethernet, Wi-Fi, etc.

One or more of the user devices 102 and the sensor position determination server 105 may be coupled to a network 104, where the network 104 in this embodiment is assumed to represent a sub-network or other related portion of a larger computer network. The network 104 is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the user devices 102 and the sensor position determination server 105 illustratively comprise processing devices of one or more processing platforms. For example, the sensor position determination server 105 can comprise one or more processing devices each having a processor and a memory, possibly implementing virtual machines and/or containers, although numerous other configurations are possible. The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

One or more of the user devices 102 and the sensor position determination server 105 can additionally or alternatively be part of edge infrastructure and/or cloud infrastructure such as an Amazon Web Services (AWS) system. Other examples of cloud-based systems that can be used to provide at least portions of the user devices 102 and/or the sensor position determination server 105 include Dell Cloud, Google Cloud Platform (GCP) and Microsoft Azure.

As shown in FIG. 1, the exemplary sensor position determination server 105 comprises a sensor data processing module 112, an environment state prediction module 114, a sensor position determination module 116 and a sensor movement instruction module 118, as discussed further below. In one or more embodiments, the sensor data processing module 112 may be used, for example, to perform one or more pre-processing tasks on at least some of the sensor data generated by multiple mobile sensors in an environment to prepare the sensor data for further processing by one or more machine learning models. The environment state prediction module 114 may be used to employ one or more environment state prediction models to process the sensor data from the multiple mobile sensors and to predict one or more future sensor measurement values by the multiple mobile sensors for a plurality of positions in an environment. As used herein, the term "multiple mobile sensors" shall be broadly construed for example to encompass sensors that can reposition themselves, as well as sensors that are repositioned by other means.

In the example of FIG. 1, the exemplary sensor position determination module 116 employs one or more machine learning-based sensor position determination models to evaluate the predictions generated by the environment state prediction module 114 and to determine a new position for at least some of the multiple mobile sensors. The sensor movement instruction module 118 initiates a movement of the at least some of the multiple mobile sensors to the new position recommended by the sensor position determination module 116.

It is to be appreciated that this particular arrangement of modules 112, 114, 116, 118 illustrated in the sensor position determination server 105 of the FIG. 1 embodiment is presented by way of example only, and alternative arrangements can be used in other embodiments. For example, the functionality associated with modules 112, 114, 116, 118 in other embodiments can be combined into a single module, or separated across a larger number of modules. As another example, multiple distinct processors and/or memory elements can be used to implement different ones of modules 112, 114, 116, 118 or portions thereof. At least portions of modules 112, 114, 116, 118 may be implemented at least in part in the form of software that is stored in memory and executed by a processor.

The sensor position determination server 105 may further include one or more additional modules and other components typically found in conventional implementations of such devices, although such additional modules and other components are omitted from the figure for clarity and simplicity of illustration.

In the FIG. 1 embodiment, the sensor position determination server 105 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the sensor position determination server 105 to reside in different data centers. Numerous other distributed implementations of the components of the system 100 are possible.

As noted above, the sensor position determination server 105 can have an associated environment database 106 configured to store information related to one or more of the mobile sensors, and/or an environment monitored by the mobile sensors. Although the environment information is stored in the example of FIG. 1 in a single environment database 106, in other embodiments, an additional or alternative instance of the environment database 106, or portions thereof, may be incorporated into the sensor position determination server 105 or other portions of the system 100.

The environment database 106 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 and the sensor position determination server 105 can be one or more input/output devices (not shown), which illustratively comprise keyboards, displays or other types of input/output devices in any combination. Such input/output devices can be used, for example, to support one or more user interfaces to a user device 102, as well as to support communication between the sensor position determination server 105 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for adaptive sensor position determination for multiple mobile sensors is presented by way of illustrative example only, and in other embodiments additional or alternative elements may be used. Thus, another embodiment includes additional or alternative systems, devices and other network entities, as well as different arrangements of modules and other components.

Figure 2:
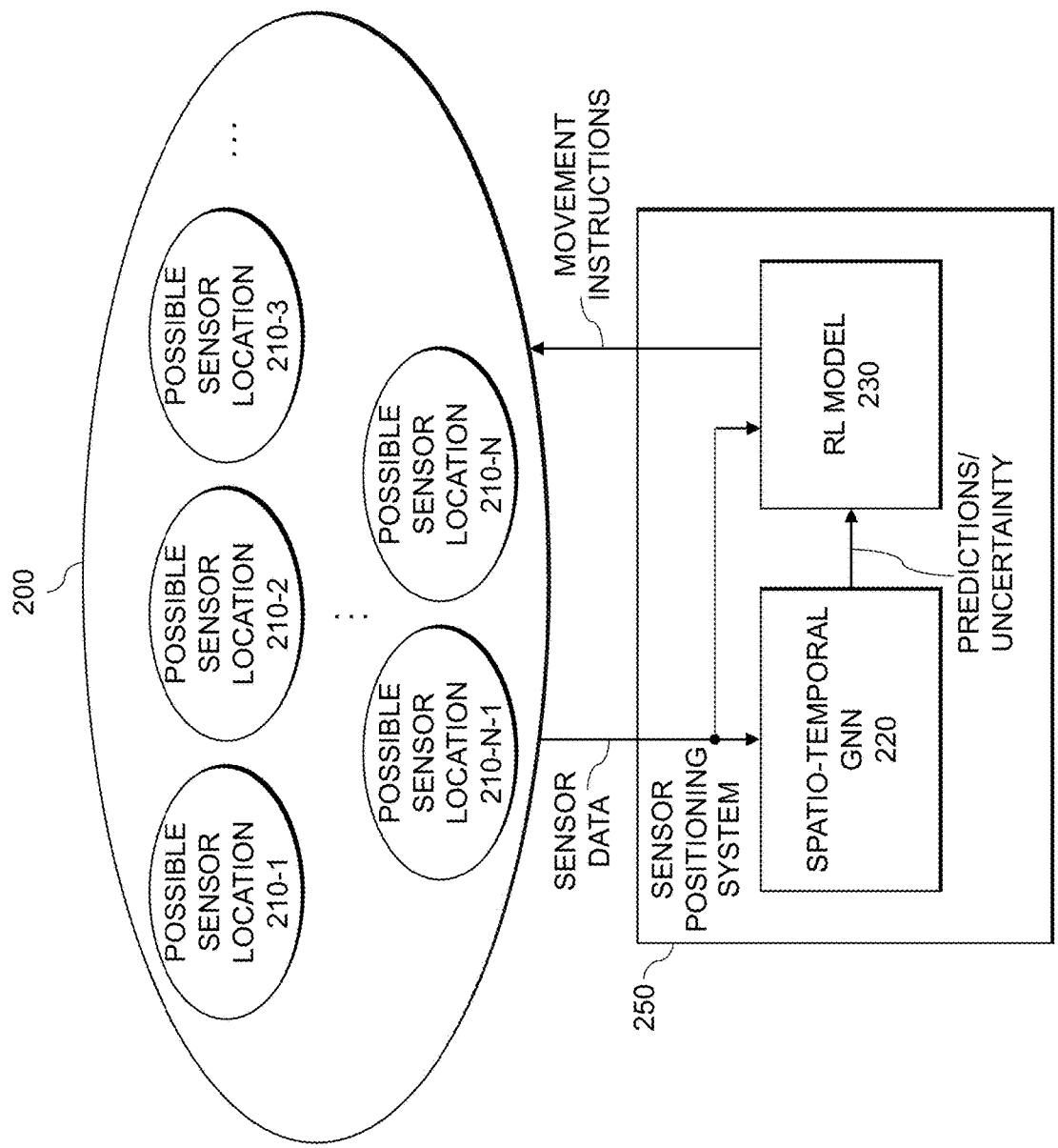
FIG. 2 illustrates an exemplary environment monitored by a sensor positioning system in accordance with an illustrative embodiment.

FIG. 2 illustrates an exemplary environment 200 monitored by a sensor positioning system 250 in accordance with an illustrative embodiment. In the example of FIG. 2, the environment 200 comprises multiple possible sensor locations 210-1 through 210-N where mobile sensors can be positioned using the disclosed adaptive sensor position determination techniques to obtain sensor data regarding the monitored environment 200. The multiple mobile sensors may be constrained in some embodiments to fixed possible locations (e.g., in a grid configuration). In other embodiments, multiple mobile sensors may be instructed to move to any possible sensor location 210 in the environment 200, such as to a set of global coordinates.

In some embodiments, a spatio-temporal representation is generated to represent the collected sensor data in graph form. As there are typically more possible sensor locations 210 in the environment 200 than the number of mobile sensors, not all nodes in the spatio-temporal representation comprise a measurement for each time instant. Thus, the certainty value associated with a prediction will typically be higher for possible sensor locations 210 having current (or at least recent) measurements than for other possible sensor locations 210 not recently measured.

The sensor positioning system 250 comprises a spatio-temporal GNN 220 and an RL model 230. The sensor data from sensors in the environment 200 is provided to the spatio-temporal GNN 220 that generates a prediction of a future state of the environment 200, such as at least one future sensor measurement value for a plurality of positions in the spatio-temporal representation, as well as an uncertainty value for each prediction indicating a confidence of the environment state prediction model in a corresponding prediction. In one or more embodiments, the spatio-temporal GNN 220 will predict values for possible sensor locations 210 where sensor data is missing, without using such predictions to compute a loss value, as discussed further below in conjunction with FIG. 2.

The predictions and the corresponding uncertainty values are provided, along with the uncertainty value for each prediction and the actual sensor data, to the RL model 230 that determines at least one new position for each of one or more of the plurality of mobile sensors using the predictions and a determined reward, as discussed further below in conjunction with FIG. 4. The new position for at least some of the plurality of mobile sensors may be conveyed in some embodiments in the form of movement instruction. Following the provision of such movement instructions, the mobile sensors will change positions in the environment 200 accordingly, with the uncertainty predictions updated accordingly.

In some embodiments, the spatio-temporal GNN 220 and the RL model 230 can be implemented as part of an edge device. While one or more exemplary embodiments described herein employ a GNN for the environment state prediction model, a convolutional neural network can also be applied, as would be apparent to a person of ordinary skill in the art.

Figure 3:
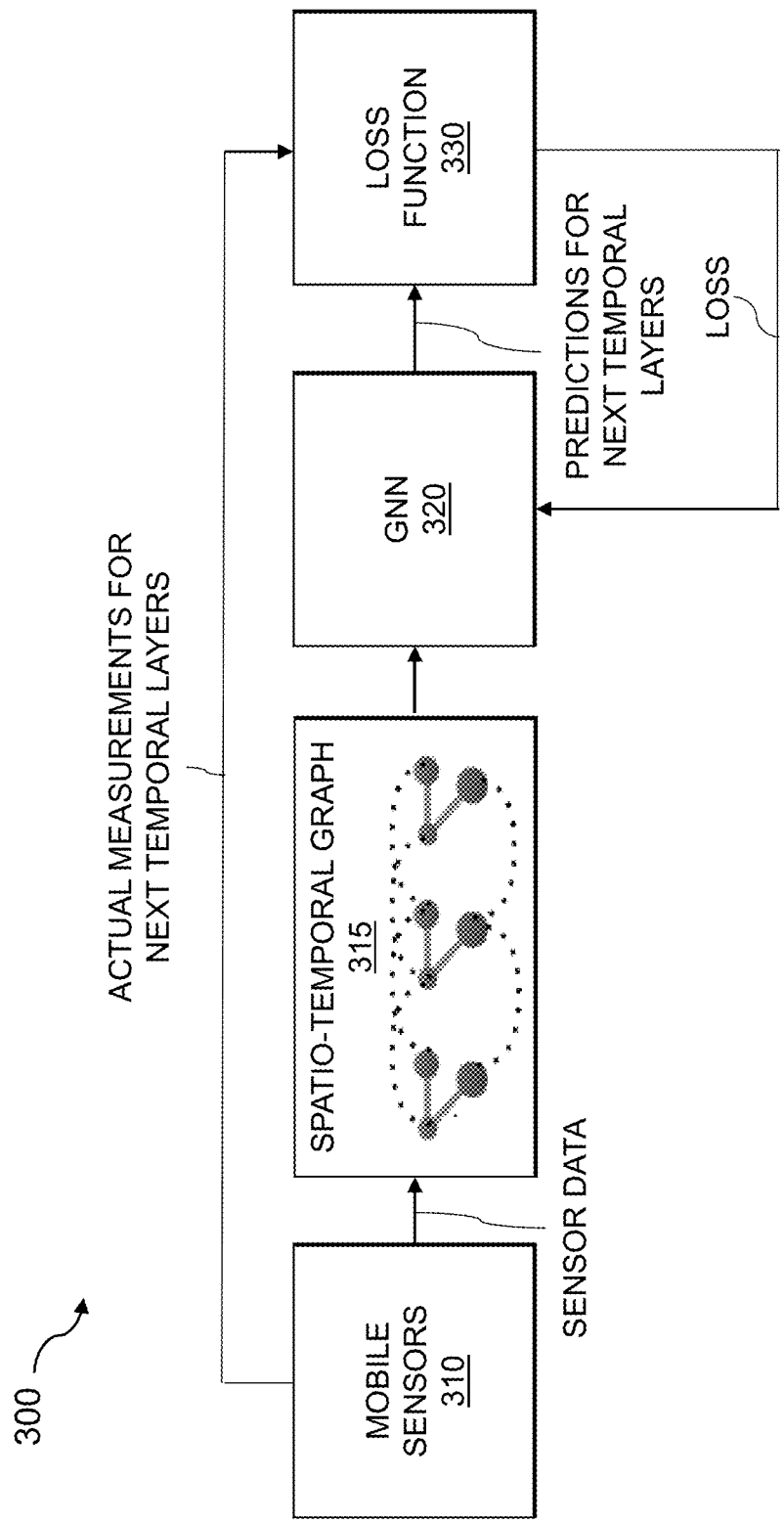
FIG. 3 illustrates a GNN, configured in an exemplary GNN training mode, in accordance with an illustrative embodiment.

FIG. 3 illustrates a GNN 320, configured in an exemplary GNN training mode 300, in accordance with an illustrative embodiment. In the example of FIG. 3, a plurality of mobile sensors 310 generate sensor data that is represented in the form of a spatio-temporal graph 315. As noted above, in the spatio-temporal graph 315, each temporal layer relates to a different time point, and comprises multiple nodes, where each node in a given layer corresponds to the possible sensor locations 210 for the mobile sensors in the environment 200 and comprises the sensor data collected by each sensor (e.g., images, recordings, or features such as humidity and/or temperature).

The spatio-temporal graph 315 is applied to the GNN 320 that generates a prediction of future values in some embodiments for all possible sensor locations 210 (that is, predictions for the next temporal layers), in addition to an uncertainty value for each prediction (e.g., a probability associated with each prediction, representing the model confidence or uncertainty, not explicitly shown in FIG. 3).

The GNN 320 may be trained in some embodiments using the spatio-temporal graph 315 created from the sensor data. The predictions generated by the GNN 320 may be applied to a loss function 330, together with the actual measurements for the next temporal layers generated by the mobile sensors 310. The loss function 330 determines a loss value based at least in part on a difference between the predictions for the next temporal layers generated by the GNN 320 and the actual measurements for the next temporal layers generated by the mobile sensors 310. The loss value is applied in a feedback manner to update and/or retrain the GNN 320, using, for example, supervised GNN training techniques (e.g., using a value that the prediction aspires to be similar to). One or more aspects of the disclosure recognize that similar nodes in the spatio-temporal graph 315 have similar embeddings. The unsupervised loss function 330 can be a loss based on node proximity in the spatio-temporal graph 315, or random walks, as would be apparent to a person of ordinary skill in the art.

Figure 4:
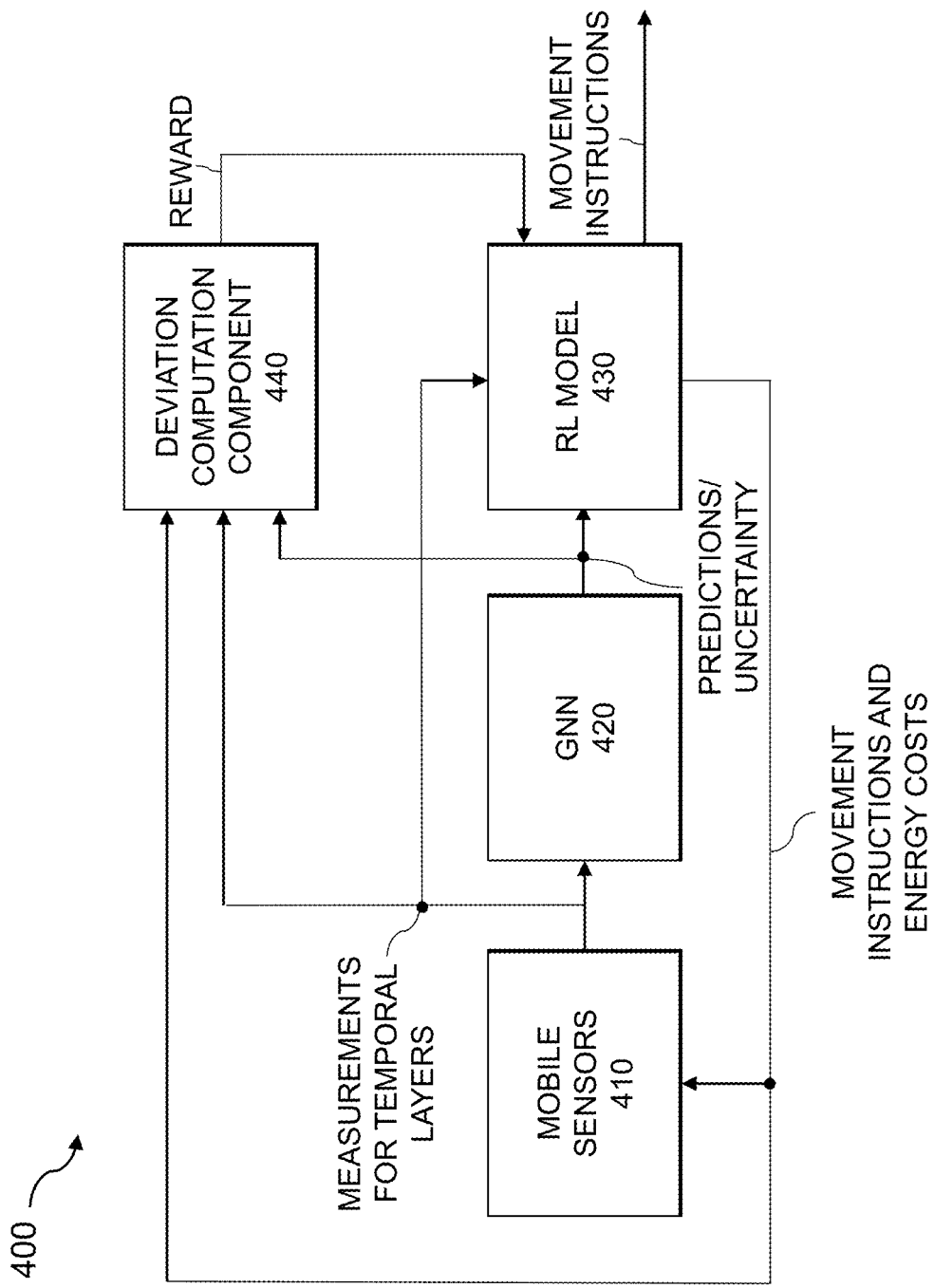
FIG. 4 illustrates a sensor position determination system that performs an adaptive determination of sensor positions for the mobile sensors in the exemplary environment of FIG. 2, in accordance with an illustrative embodiment.

FIG. 4 illustrates a sensor position determination system 400 that performs an adaptive determination of sensor positions for the mobile sensors in the exemplary environment of FIG. 2, in accordance with an illustrative embodiment. Generally, reinforcement learning is based on machine learning techniques that determine how intelligent agents should take actions in an environment to substantially maximize the notion of a cumulative reward. RL techniques typically find a balance between exploration of new states and exploitation of known states. The predictions made by RL models may be uncertain as they are prone to noise and inaccurate model inference, as well as assumptions that may be inherent in the case of uncertainty. The disclosed techniques for adaptive sensor position determination provide a mechanism for dealing with such uncertainty in some embodiments.

As shown in FIG. 4, a plurality of mobile sensors 410 generate sensor data that may be represented in the form of a spatio-temporal graph comprising measurements for the temporal layers. As noted above, the sensor data from the mobile sensors 410 is applied to a GNN 420 that generates a prediction of future values in some embodiments for all possible sensor locations 210 (that is, predictions for the next temporal layers), in addition to an uncertainty value for each prediction (e.g., a probability associated with each prediction, representing the model confidence or uncertainty).

The uncertainty values may be determined in some embodiments using a training stage and a confidence stage, in which another neural network learns to quantify the uncertainty of the trained neural network generated by the GNN training mode 300 of FIG. 3. Then, for new examples (e.g., previously unseen data) the GNN 420 can both provide a prediction and an uncertainty value that quantifies the certainty of each prediction, as discussed above in conjunction with FIG. 2.

The predictions, corresponding uncertainty values and the measurements for the temporal layers are applied to an RL model 430 that determines at least one new position for each of one or more of the plurality of mobile sensors using the predictions and a reward determined by a deviation computation component 440. The reward may be determined, for example, based on a policy or a metric that assigns a disproportionally larger reward for larger deviations. In other embodiments, a capped reward may be determined based on a metric that assigns a smaller reward for larger deviations (e.g., when all mistakes over a threshold are considered bad).

In some embodiments, the RL model 430 is trained on the reward that it gets for the actions, which is the deviation between the prediction for each location (generated by the GNN 420) and the sensor measurements for the corresponding temporal layer(s) (generated by the mobile sensors 410). The RL model 430 can be considered an implementation of a multi-armed bandit system, where the arms of the multi-armed bandit correspond to the mobile sensors 410 in the sensor swarm, a slot machine is selected, in the form of sensing data at a specific position in the environment 200 (e.g., a specific node of the spatio-temporal graph 315) and the reward will be the dissimilarity between the prediction by the GNN 420 and the actual measurements sensed by the mobile sensors 410. The multi-armed bandit model aims to substantially maximize the deviation (e.g., the GNN 420 predicts information that will be displaced when the mobile sensors 410 move and collect actual sensor data). In some embodiments, the goal is to achieve a larger deviation between the prediction for each location (generated by the GNN 420) and the sensor measurements for the corresponding temporal layer(s) (generated by the mobile sensors 410) in order to correct mistakes of the GNN 420 for a subsequent point in time by changing the locations of the mobile sensors 410.

For different data types, different deviation measures should be used. For example, for numeric values, a RMSE (root mean square error) could be used; for categorical values, weights can be chosen to represent the cost of a misprediction; and for multi-dimensional photographs and videos, various similarity learning techniques may be employed. In some embodiments, the data type of a measured value may not be the same data type as that of the sensor. For example, for photographic sensors, the measured value may be the number of cars in an image.

Figure 5:
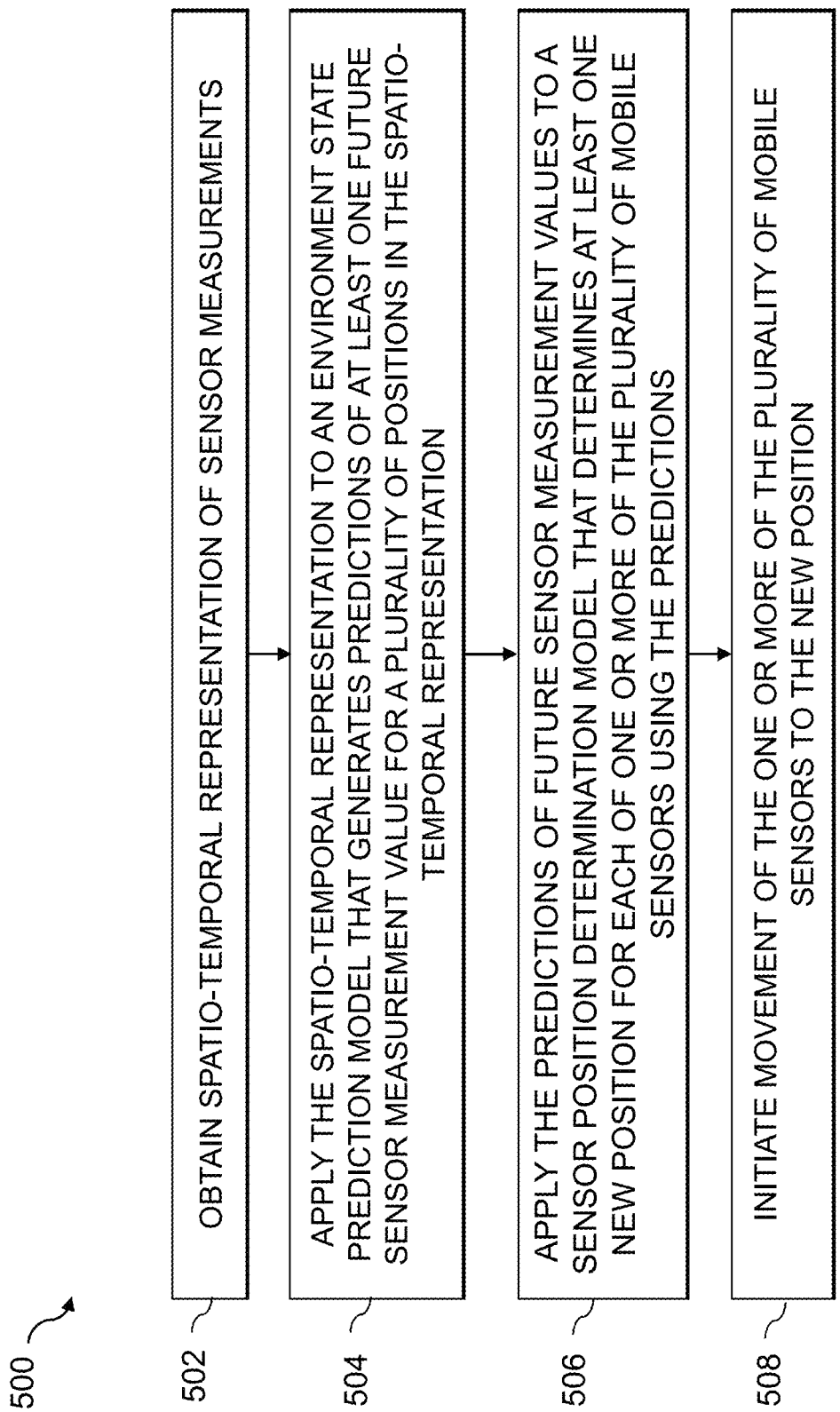
FIG. 5 is a flow diagram illustrating an exemplary implementation of an adaptive sensor position determination process for positioning multiple mobile sensors in accordance with an illustrative embodiment.

FIG. 5 is a flow diagram illustrating an exemplary implementation of an adaptive sensor position determination process 500 for positioning multiple mobile sensors in an environment in accordance with an illustrative embodiment. In the example of FIG. 5, the adaptive sensor position determination process 500 initially obtains a spatio-temporal representation of sensor measurements (from a plurality of mobile sensors) in step 502. The spatio-temporal representation may comprise a plurality of layers each corresponding to a different point in time, wherein a given layer comprises a plurality of positions, and wherein each position in the given layer of the spatio-temporal representation corresponds to a possible location for at least one of the plurality of mobile sensors in an environment.

In step 504, the spatio-temporal representation is applied to an environment state prediction model that generates a prediction of at least one future sensor measurement value for a plurality of positions in the spatio-temporal representation. The predictions of the at least one future sensor measurement value are applied in step 506 to a sensor position determination model that determines at least one new position for each of one or more of the plurality of mobile sensors using the predictions. Finally, a movement of the one or more of the plurality of mobile sensors to the new position is initiated in step 508.

In some embodiments, the environment state prediction model may comprise, for example, a GNN and the sensor position determination model may comprise a reinforcement learning model. The reinforcement learning model may determine the new position for the at least some mobile sensors based at least in part on positions having a higher uncertainty value relative to other positions. The reinforcement learning model may determine the new position for a given mobile sensor based at least in part on a proximity of the given mobile sensor to the new position and/or an energy cost associated with moving the given mobile sensor to the new position.

In one or more embodiments, the environment state prediction model further generates an uncertainty value for each prediction indicating a confidence of the environment state prediction model in a corresponding prediction and the method may further comprise applying the uncertainty value for each prediction to the sensor position determination model that determines the new position for at least some of the plurality of mobile sensors.

The particular processing operations and other network functionality described in conjunction with the flow diagram of FIG. 5 are presented by way of illustrative example only, and should not be construed as limiting the scope of the disclosure in any way. Alternative embodiments can use other types of processing operations for adaptive sensor position determination for multiple mobile sensors. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the reinforcement learning model may determine the new position for a given mobile sensor based at least in part on a proximity of the given mobile sensor to the new position. For example, the environment may not be accurately representable as a discrete graph, but rather as a two-dimensional or volumetric mesh. In such cases, the mobile sensors are free to move around without any limits. Thus, it may be desirable to send a mobile sensor that is closer to a new sensor location rather than sending a mobile sensor that is farther away (but may have increased information gain), because the time required for travel may reduce the information gain in total.

In addition, the reinforcement learning model may determine a new position for a given mobile sensor based at least in part on an energy cost associated with moving the given mobile sensor to the new position. For example, a cost function may be employed that incorporates the energy costs of moving the sensors around the environment 200, to preserve their energy.

In various embodiments, the disclosed techniques for adaptive sensor position determination may be employed in a number of environments. In an agriculture environment, for example, a drone sensor fleet may have a large agriculture field to monitor and measure (e.g., plant or soil moisture). As the moisture tends to be the same in a given small area, the adaptive sensor position determination system will learn to attribute high confidence to areas that are close to a recent measurement, and the drones will be able to adaptively move around in a data-driven way. Further, in a smart city environment, urban sensor drones may look for traffic jams throughout the city. The adaptive sensor position determination system may learn that in many places it can effectively predict the existence of traffic jams, but at other places, a continuous check may be required as the uncertainty there is higher. After receiving the sensed information, a smart traffic system will be able to shift the traffic accordingly. In a satellite/airplane imagery environment, where the systems may include satellite or airplane imagery with highly accurate data, the cost may be very high as well. Improving the positioning of the imagery to uncertain areas will decrease the amount of airplanes and/or satellites that are required, with possibly significant cost reductions.

The disclosed techniques for adaptive sensor position determination employ uncertainty quantification and RL model techniques to adaptively control the locations of sensors in a sensor swarm. The disclosed adaptive sensor position determination control system will enable improved information gain from the swarm, leading to improved predictions by the AI engine. Further, the information gained is improved for a sensor swarm, by sending the sensors to places where the predictions are more likely to be inaccurate. Consequently, the information available to the prediction algorithm will increase and will increase the prediction performance.

One or more embodiments of the disclosure provide improved methods, apparatus and computer program products for providing adaptive sensor position determination for multiple mobile sensors. The foregoing applications and associated embodiments should be considered as illustrative only, and numerous other embodiments can be configured using the techniques disclosed herein, in a wide variety of different applications.

It should also be understood that the disclosed techniques for adaptive sensor position determination, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adaptive sensor position determination may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprising cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based adaptive sensor position determination engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based remote learning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
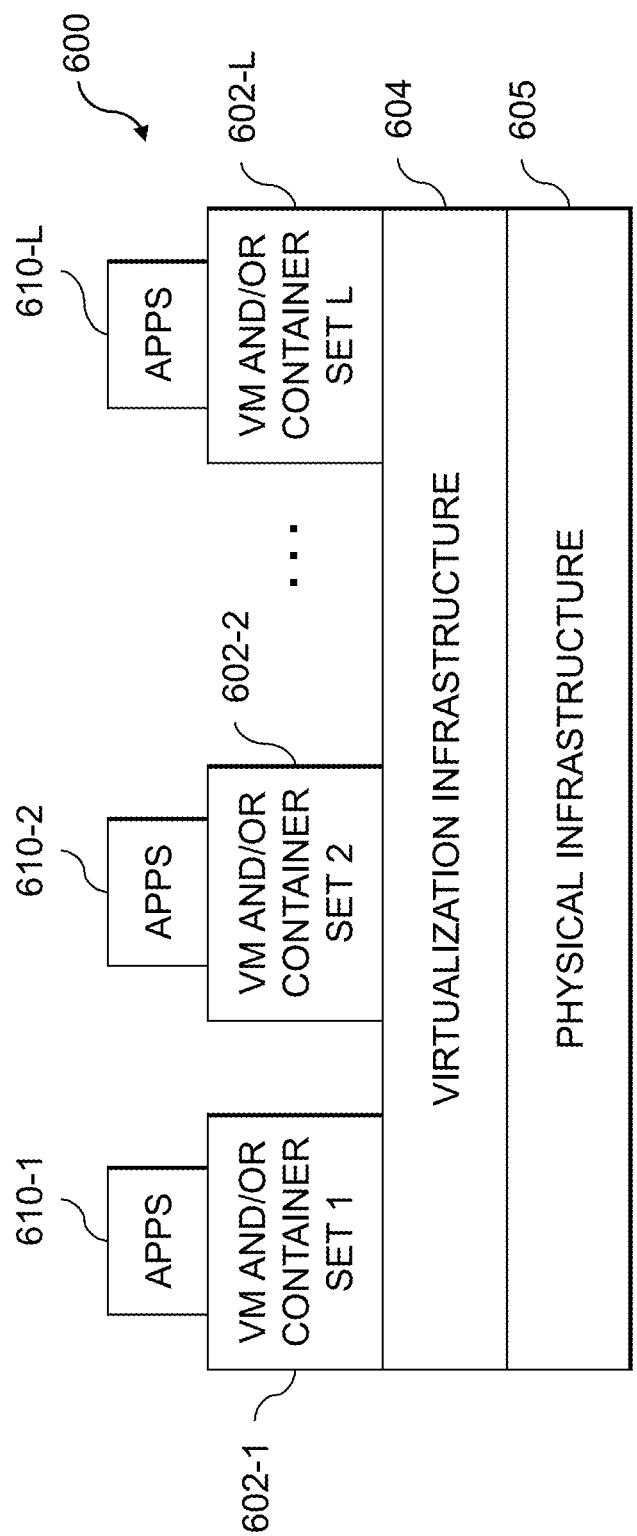
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide adaptive sensor position determination functionality of the type described above for one or more processes running on a given one of the VMs. For example, each of the VMs can implement adaptive sensor position determination control logic and associated functionality for instructing one or more sensors to move to a newly determined position.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide adaptive sensor position determination functionality of the type described above for one or more processes running on different ones of the containers. For example, a container host device supporting multiple containers of one or more container sets can implement one or more instances of adaptive sensor position determination control logic and associated functionality for instructing one or more sensors to move to a newly determined position.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a CPU, a GPU, a TPU, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
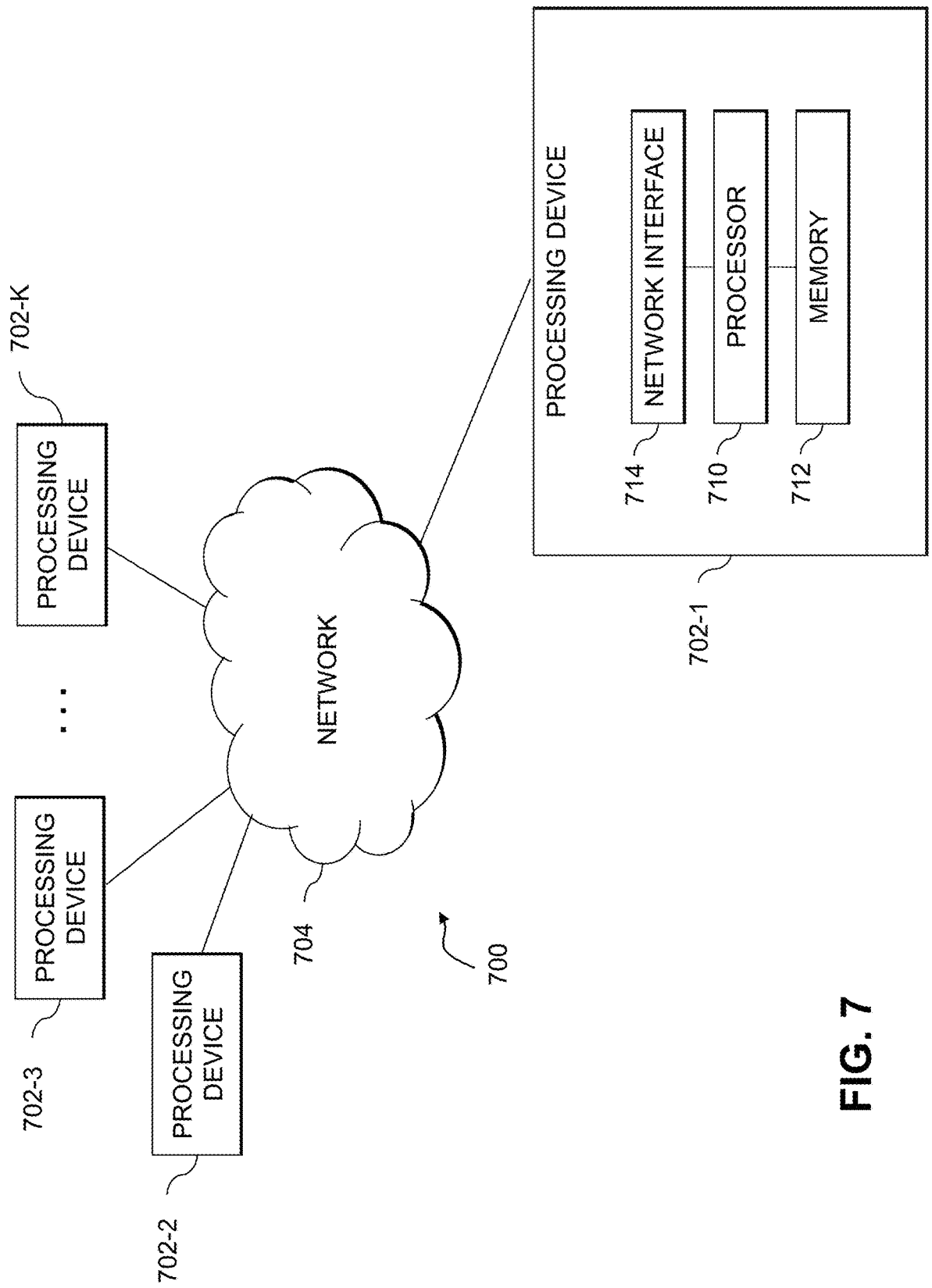
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a spatio-temporal representation of sensor measurements, from a plurality of mobile sensors, wherein the spatio-temporal representation comprises a plurality of layers each corresponding to a different point in time, wherein a given layer comprises a plurality of positions, and wherein each position in the given layer of the spatio-temporal representation corresponds to a possible location for at least one of the plurality of mobile sensors in an environment;
applying the spatio-temporal representation to an environment state prediction model that generates a prediction of at least one future sensor measurement value for a plurality of positions in the spatio-temporal representation;
applying the predictions of the at least one future sensor measurement value to a sensor position determination model that determines at least one new position for each of one or more of the plurality of mobile sensors using the predictions; and
initiating a movement of the one or more of the plurality of mobile sensors to the new position;
wherein the method is performed by at least one processing device comprising a processor coupled to a memory.

2. The method of claim 1, wherein the environment state prediction model comprises a graph neural network.

3. The method of claim 1, wherein the sensor position determination model comprises a reinforcement learning model.

4. The method of claim 3, wherein the reinforcement learning model determines the new position for the at least some of the plurality of mobile sensors based at least in part on positions having a higher uncertainty value relative to other positions.

5. The method of claim 3, wherein the reinforcement learning model determines the new position for a given mobile sensor based at least in part on a proximity of the given mobile sensor to the new position.

6. The method of claim 3, wherein the reinforcement learning model determines the new position for a given mobile sensor based at least in part on an energy cost associated with moving the given mobile sensor to the new position.

7. The method of claim 1, wherein a number of the positions in a plurality of the layers of the spatio-temporal representation is greater than a number of the plurality of mobile sensors.

8. The method of claim 1, wherein the plurality of mobile sensors comprises a coordinated group of sensors.

9. The method of claim 1, wherein the environment state prediction model further generates an uncertainty value for each prediction indicating a confidence of the environment state prediction model in a corresponding prediction and further comprising applying the uncertainty value for each prediction to the sensor position determination model that determines the new position for at least some of the plurality of mobile sensors.

10. An apparatus comprising:
at least one processing device comprising a processor coupled to a memory;
the at least one processing device being configured to implement the following steps:
obtaining a spatio-temporal representation of sensor measurements, from a plurality of mobile sensors, wherein the spatio-temporal representation comprises a plurality of layers each corresponding to a different point in time, wherein a given layer comprises a plurality of positions, and wherein each position in the given layer of the spatio-temporal representation corresponds to a possible location for at least one of the plurality of mobile sensors in an environment;
applying the spatio-temporal representation to an environment state prediction model that generates a prediction of at least one future sensor measurement value for a plurality of positions in the spatio-temporal representation;
applying the predictions of the at least one future sensor measurement value to a sensor position determination model that determines at least one new position for each of one or more of the plurality of mobile sensors using the predictions; and
initiating a movement of the one or more of the plurality of mobile sensors to the new position.

11. The apparatus of claim 10, wherein the environment state prediction model comprises a graph neural network and the sensor position determination model comprises a reinforcement learning model.

12. The apparatus of claim 11, wherein the reinforcement learning model determines the new position for the at least some of the plurality of mobile sensors based at least in part on positions having a higher uncertainty value relative to other positions.

13. The apparatus of claim 11, wherein the reinforcement learning model determines the new position for a given mobile sensor based at least in part on one or more of a proximity of the given mobile sensor to the new position and an energy cost associated with moving the given mobile sensor to the new position.

14. The apparatus of claim 10, wherein a number of the positions in a plurality of the layers of the spatio-temporal representation is greater than a number of the plurality of mobile sensors.

15. The apparatus of claim 10, wherein the environment state prediction model further generates an uncertainty value for each prediction indicating a confidence of the environment state prediction model in a corresponding prediction and further comprising applying the uncertainty value for each prediction to the sensor position determination model that determines the new position for at least some of the plurality of mobile sensors.

16. A non-transitory processor-readable storage medium having stored therein program code of one or more software programs, wherein the program code when executed by at least one processing device causes the at least one processing device to perform the following steps:
obtaining a spatio-temporal representation of sensor measurements, from a plurality of mobile sensors, wherein the spatio-temporal representation comprises a plurality of layers each corresponding to a different point in time, wherein a given layer comprises a plurality of positions, and wherein each position in the given layer of the spatio-temporal representation corresponds to a possible location for at least one of the plurality of mobile sensors in an environment;
applying the spatio-temporal representation to an environment state prediction model that generates a prediction of at least one future sensor measurement value for a plurality of positions in the spatio-temporal representation;
applying the predictions of the at least one future sensor measurement value to a sensor position determination model that determines at least one new position for each of one or more of the plurality of mobile sensors using the predictions; and
initiating a movement of the one or more of the plurality of mobile sensors to the new position.

17. The non-transitory processor-readable storage medium of claim 16, wherein the environment state prediction model comprises a graph neural network and the sensor position determination model comprises a reinforcement learning model.

18. The non-transitory processor-readable storage medium of claim 17, wherein the reinforcement learning model determines the new position for the at least some of the plurality of mobile sensors based at least in part on positions having a higher uncertainty value relative to other positions.

19. The non-transitory processor-readable storage medium of claim 17, wherein the reinforcement learning model determines the new position for a given mobile sensor based at least in part on one or more of a proximity of the given mobile sensor to the new position and an energy cost associated with moving the given mobile sensor to the new position.

20. The non-transitory processor-readable storage medium of claim 16, wherein the environment state prediction model further generates an uncertainty value for each prediction indicating a confidence of the environment state prediction model in a corresponding prediction and further comprising applying the uncertainty value for each prediction to the sensor position determination model that determines the new position for at least some of the plurality of mobile sensors.

* * * * *